(12) United States Patent
Berwager

(10) Patent No.: US 12,279,548 B2
(45) Date of Patent: Apr. 22, 2025

(54) STEERABLE FRONT DISC MOWER

(71) Applicant: CNH Industrial America LLC, New Holland, PA (US)

(72) Inventor: Alex Berwager, New Holland, PA (US)

(73) Assignee: CNH Industrial America LLC, Holland, PA (US)

( * ) Notice: Subject to any disclaimer, the term of this patent is extended or adjusted under 35 U.S.C. 154(b) by 146 days.

(21) Appl. No.: 18/322,405

(22) Filed: May 23, 2023

(65) Prior Publication Data

US 2024/0389501 A1    Nov. 28, 2024

(51) Int. Cl.
*A01D 34/00* (2006.01)
*A01B 69/04* (2006.01)
*A01D 101/00* (2006.01)

(52) U.S. Cl.
CPC .......... *A01D 34/006* (2013.01); *A01B 69/008* (2013.01); *A01D 2101/00* (2013.01)

(58) Field of Classification Search
CPC . A01D 34/006; A01D 2101/00; A01B 69/008
USPC ........................................................ 701/104
See application file for complete search history.

(56) References Cited

U.S. PATENT DOCUMENTS

| | | |
|---|---|---|
| 4,478,026 A | 10/1984 | Mullet et al. |
| 2006/0191250 A1 | 8/2006 | Neuerburg et al. |
| 2021/0127551 A1* | 5/2021 | Priepke ................ A01B 69/008 |

FOREIGN PATENT DOCUMENTS

EP      1 321 027 B1      6/2003

* cited by examiner

*Primary Examiner* — Mahmoud Gimie
(74) *Attorney, Agent, or Firm* — Peter K. Zacharias; Rickard K. DeMille; Rebecca L. Henkel

(57) ABSTRACT

A system includes an agricultural vehicle, a rear-mounted mower coupled to the agricultural vehicle by a rear hitch, a front-mounted mower pivotably coupled to a front hitch of the vehicle by a pivot member and at least one pivot-adjustment mechanism, and a control system configured to control the front-mounted mower. The control system includes processing circuitry configured to obtain a steering angle signal from a sensor, assign a value to the signal, determine if the value exceeds a first threshold, and responsive to determining that the value exceeds the first threshold, transmit a first instruction to adjust the at least one pivot-adjustment mechanism from a first position to a second position.

20 Claims, 7 Drawing Sheets

STEERABLE FRONT DISC MOWER

BACKGROUND

This disclosure relates generally to agricultural vehicles configured with triple mowers. When mowing with triple mowers (with one front-mounted mower and two rear-mounted mowers) it is common to miss crop during a turning event due to the lack of overlap between the front-mounted mower and rear-mounted mowers. During the turning event, the front mower is dragged laterally across the mowing area, such that the cutting mechanism engages with the crop at an angle, leading to suboptimal cutting.

SUMMARY

One implementation of the present disclosure relates to a system. The system includes: an agricultural vehicle; a rear-mounted mower coupled to the agricultural vehicle by a rear hitch; a front-mounted mower pivotably coupled to a front hitch by a pivot member and at least one pivot-adjustment mechanism, the front hitch removeably coupled to the agricultural vehicle; and a control system configured to control the front-mounted mower, the control system including processing circuitry configured to: obtain a signal from a sensor, the sensor configured to determine a steering angle of the agricultural vehicle; assign a value to the signal; determine if the value exceeds a first threshold; responsive to determining that the value exceeds the first threshold, transmit a first instruction to adjust the at least one pivot-adjustment mechanism from a first position to a second position; execute the first instruction by adjusting the at least one pivot-adjustment mechanism from the first position to the second position; responsive to the value not exceeding the first threshold, determine if the value exceeds a second threshold; responsive to determining that the value exceeds the second threshold, transmit a second instruction to adjust the at least one pivot-adjustment mechanism from the first position to a third position; and execute the second instruction by adjusting the at least one pivot-adjustment mechanism from the first position to the third position.

According to an embodiment, the at least one pivot-adjustment mechanism is a hydraulic piston and cylinder mechanism.

According to an embodiment, the sensor is communicably coupled to a steering mechanism of the agricultural vehicle to measure the steering angle of the agricultural vehicle.

According to an embodiment, the sensor is communicably coupled to the processing circuitry by a universal control module (UCM) of the agricultural vehicle.

According to an embodiment, the processing circuitry is communicably coupled to the at least one pivot-adjustment mechanism by an international organization for standardization bus (ISOBUS).

According to an embodiment, the first position is a neutral position, the second position is an extended position, and the third position is a retracted position.

According to an embodiment, the second position adjusts the front-mounted mower to a position perpendicular to a direction of travel of the agricultural vehicle.

Another implementation of the present disclosures relates to a control system. The control system includes processing circuitry configured to: obtain a signal from a sensor, the sensor configured to determine a steering angle of an agricultural vehicle; assign a value to the signal; determine if the value exceeds a first threshold; responsive to determining that the value exceeds the first threshold, transmit a first instruction to adjust at least one pivot-adjustment mechanism pivotably coupled to a front-mounted mower from a first position to a second position; execute the first instruction by adjusting the at least one pivot-adjustment mechanism from the first position to the second position; determine if the value exceeds a second threshold; responsive to determining that the value exceeds the second threshold, transmit a second instruction to adjust the at least one pivot-adjustment mechanism from the first position to a third position; and execute the second instruction by adjusting the at least one pivot-adjustment mechanism from the first position to the third position.

According to an embodiment, the at least one pivot-adjustment mechanism is a hydraulic piston and cylinder mechanism.

According to an embodiment, the sensor is communicably coupled to a steering mechanism of the agricultural vehicle to measure the steering angle of the agricultural vehicle.

According to an embodiment, the sensor is communicably coupled to the processing circuitry by a universal control module (UCM) of the agricultural vehicle.

According to an embodiment, the processing circuitry is communicably coupled to the at least one pivot-adjustment mechanism by an international organization for standardization bus (ISOBUS).

According to an embodiment, the first position is a neutral position, the second position is an extended position, and the third position is a retracted position.

According to an embodiment, the second position adjusts the front-mounted mower to a position perpendicular to a direction of travel of the agricultural vehicle.

Another implementation of the present disclosure relates to a method. The method includes: obtaining a signal from a sensor, the sensor configured to determine a steering angle of an agricultural vehicle; assigning a value to the signal; determining if the value exceeds a first threshold; responsive to determining that the value exceeds the first threshold, transmitting a first instruction to adjust at least one pivot-adjustment mechanism pivotably coupled to a front-mounted mower from a first position to a second position; executing the first instruction by adjusting the at least one pivot-adjustment mechanism from the first position to the second position; responsive to the value not exceeding the first value, determining if the value exceeds a second threshold; responsive to determining that the value exceeds the second threshold, transmitting a second instruction to adjust the at least one pivot-adjustment mechanism from the first position to a third position; and executing the second instruction by adjusting the at least one pivot-adjustment mechanism from the first position to the third position.

According to an embodiment, the at least one pivot-adjustment mechanism is a hydraulic piston and cylinder mechanism.

According to an embodiment, the sensor is communicably coupled to a steering mechanism of the agricultural vehicle to measure the steering angle of the agricultural vehicle.

According to an embodiment, the sensor is communicably coupled to a processing circuitry by a universal control module (UCM) of the agricultural vehicle.

According to an embodiment, the first position is a neutral position, the second position is an extended position, and the third position is a retracted position.

According to an embodiment, the second position adjusts the front-mounted mower to a position perpendicular to a direction of travel of the agricultural vehicle.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The vehicle (e.g., lawn mower, tractor, side-by-side, truck, etc.) of the present disclosure utilizes a front and rear implement. In some embodiments the implements may be plows, rakes, balers, planters, cultivators, bush hogs, rototillers, painters, sprayers, etc. In an exemplary embodiment, the front and rear implements are mowers.

As the vehicle initiates a turning event by steering at least one tractive element, the front mower pivots to match a steering angle of the at least on tractive element. In some embodiments, the two front tractive elements are wheels and both are operatively coupled to steer the vehicle together.

Overall Vehicle

Figure 1:
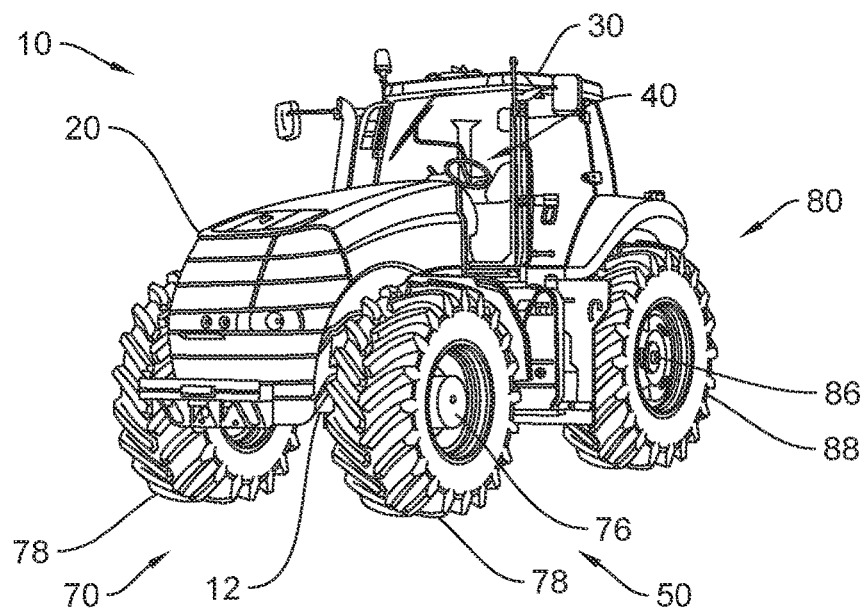
FIG. 1 is a perspective view of a vehicle, according to an exemplary embodiment.
Figure 2:
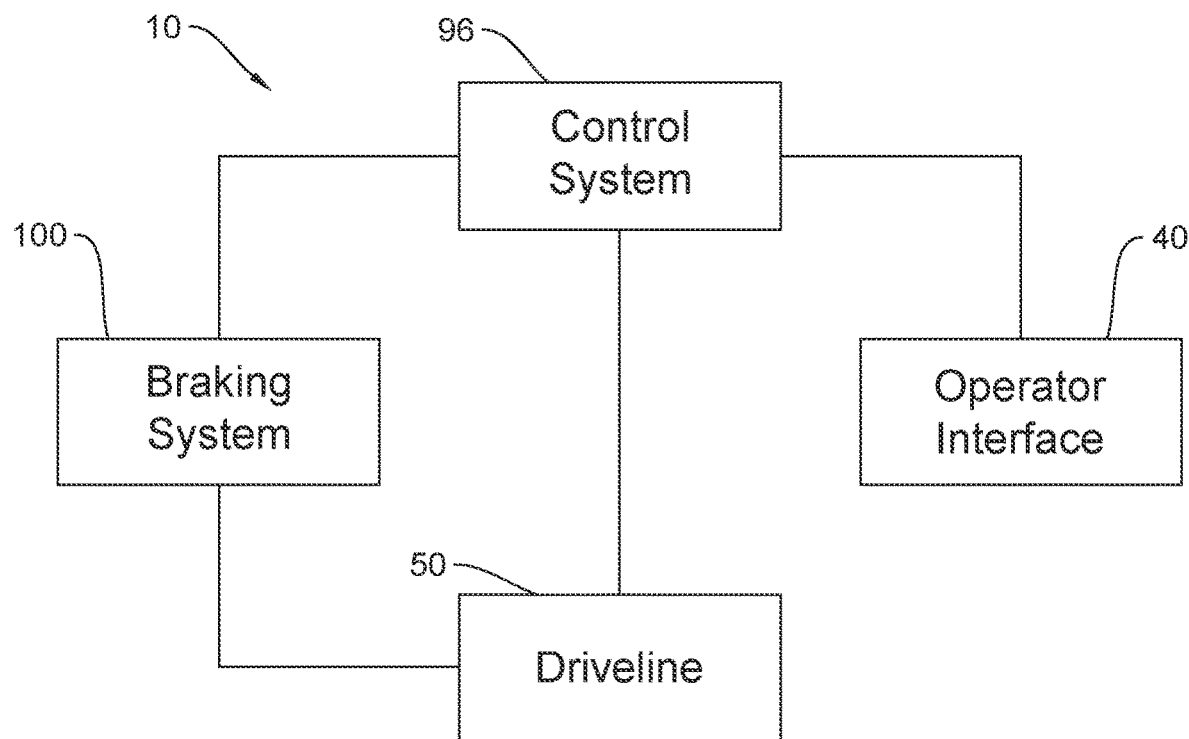
FIG. 2 is a schematic block diagram of the vehicle of FIG. 1, according to an exemplary embodiment.
Figure 3:
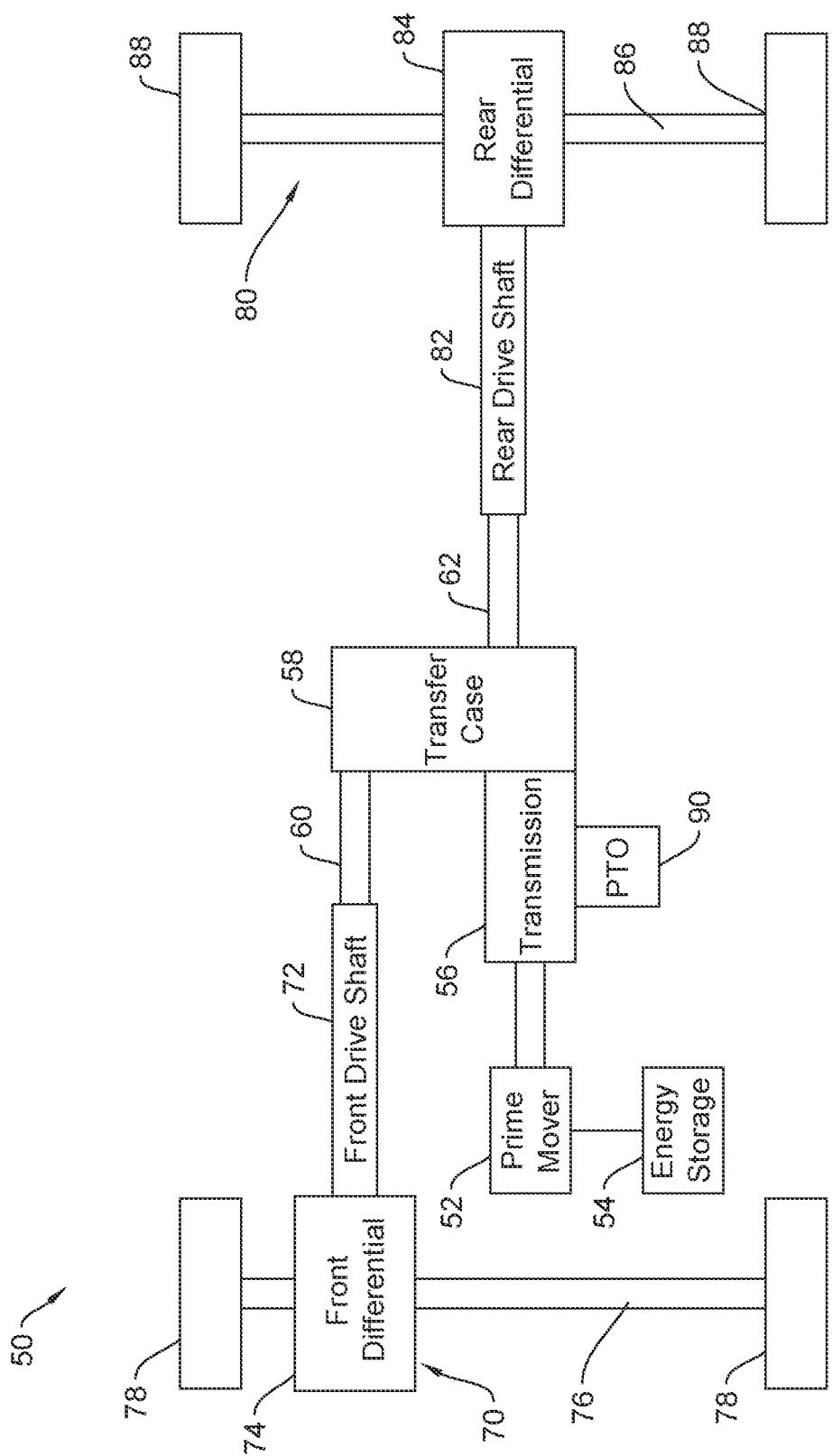
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 56) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Triple Mower

Figure 4:
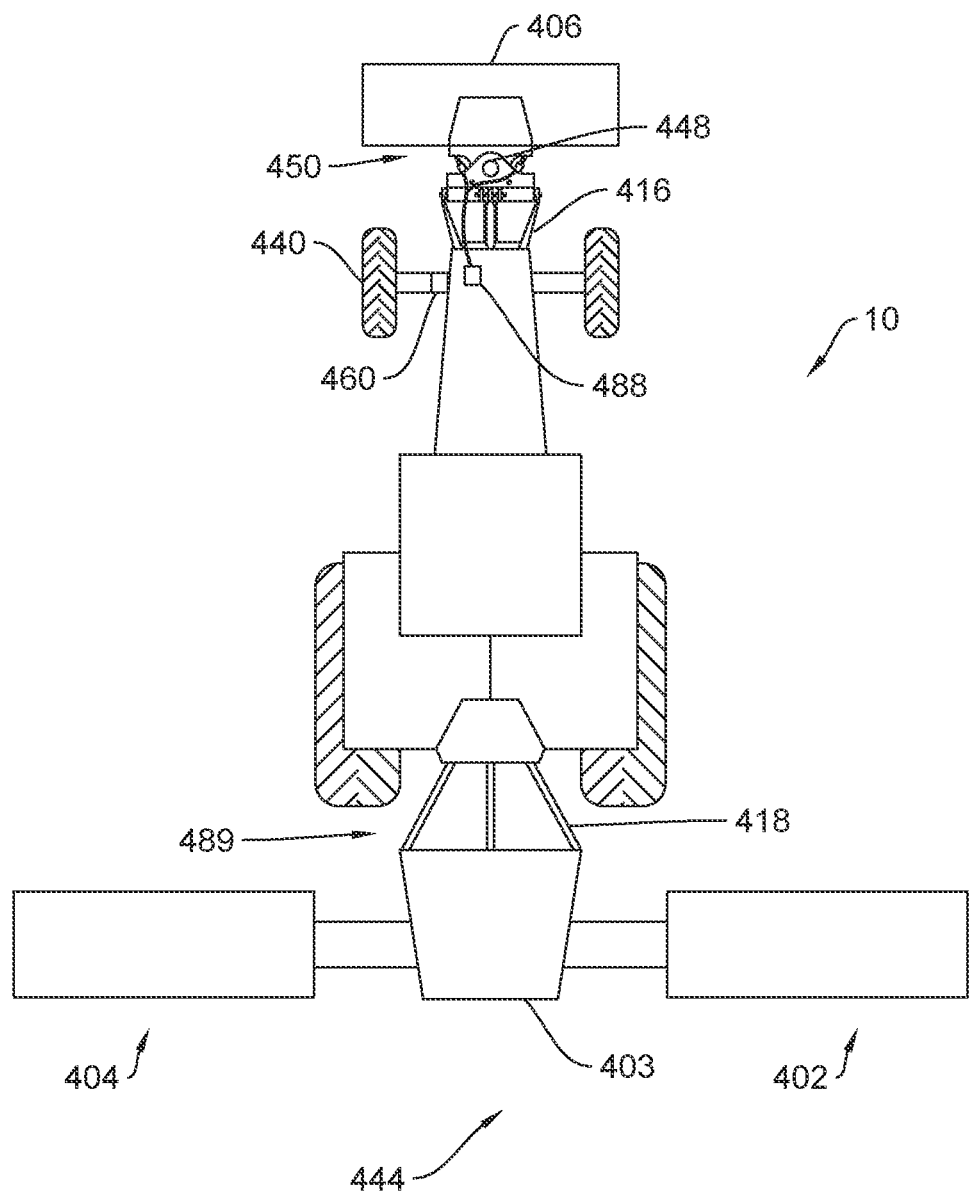
FIG. 4 is a top view of the vehicle of FIG. 1 coupled to a triple mower configuration, according to an exemplary embodiment.

Turning now to FIG. 4, a top view of the vehicle 10 is shown. Vehicle 10 may include a front-mounted mower 406, a front hitch 416, a pivot mechanism 450, at least on tractive element 440, a rear hitch 418, a steering sensor 460, and a rear-mounted mower 444. In some embodiments, the front-mounted mower 406 and the rear-mounted mowers 444 are implements other than mowers. For example, they may be rakers, balers, plows, harrows, seeders, cultivators, sprayers, etc. In some embodiments, the rear-mounted mowers 444 may comprise a left rear-mounted mower 404, a right rear-mounted mower 402, and a center member 403. The center member may include mounting points to removeably or fixedly couple to the rear hitch 418. The center member may also include a PTO connection member and corresponding gearing system to distribute rotational movement from a rear PTO of the vehicle to the left rear-mounted mower 404 and the right rear-mounted mower 406.

The vehicle 10 may be the vehicle 10 of FIG. 1. In some embodiments, vehicle 10 is a tractor with a front hitch 416 and a rear hitch 418. The rear hitch may be a three-point hitch, a drawbar, or any other suitable means for coupling an implement to a vehicle 10. The three-point hitch may have a hydraulic system that allows implements (such as mowers) to be raised and lowered, as well as to be adjusted side-to-side. Mowers that use a three-point hitch may be powered by the vehicle's 10 rear PTO or a front PTO. The three-point hitch is named for the three attachment points that it uses: two lower hitch points on the rear of the vehicle and a top link that connects to the implement.

The lower hitch links are two arms that extend from the vehicle and are designed to fit into slots on the implement. The top link is a shorter arm that connects the vehicle 10 to the implement and allows for side-to-side adjustment. The three-point hitch is operated by hydraulic cylinders that are controlled by the vehicle's hydraulic system. The drawbar is a metal bar that extends from the vehicle 10 and is attached to the implement with a hitch pin or a clevis.

The vehicle 10 may also comprise a rear PTO to drive the rear-mounted mowers 444. In some embodiments, the rear PTO is attached to the rear-mounted mowers 444 by a PTO shaft that matches the size of the vehicle's 10 rear PTO. In some embodiments, the PTO shaft has a splined shaft and locking collar that couples to the vehicle's 10 rear PTO to transfer the rear PTO rotation to the rear-mounted mowers 444. Because in some embodiments, the rear-mounted mowers 444 are comprised of two portions (the left rear-mounted mower 404 and the right rear mower 402), a gearing mechanism is coupled to the PTO shaft that may be used to convert the rear PTO rotation to rotational motion at both left rear-mounted mower 404 and right rear-mounted mower 402. Alternatively, a hydraulic system may be used to power and actuate the rear-mounted mowers 444. The hydraulic system may be housed locally on the vehicle 10 or may be housed on the rear-mounted mowers 444. The right rear-mounted mower 402 and the left rear-mounted mower 404 may articulate independently of each other to follow the contours of the ground upon which the rear-mounted mowers 444 is mowing. Each rear-mounted mower 402, 404, may pivot, raise, lower, and laterally adjust independent of the other.

The front-mounted mower 406 may be mounted on the front hitch 416 of the vehicle 10. The front hitch 416 may be a front-end loader, according to some embodiments. In other embodiments, the front-mounted mower 406 may be coupled to the vehicle 10 by a three-point hitch system, as in the rear. As in the rear, the cutting mechanism of the front-mounted mower 406 may be driven by a PTO (e.g., a front PTO) and coupled to the front PTO by a front PTO shaft. The front-mounted mower 406 may articulate to pivot about a longitudinal axis of the vehicle 10 to allow the front-mounted mower 406 to follow the contours of the ground. Front-mounted mower 406 may also be adjusted vertically, laterally, and be pivoted through the use of hydraulics, electric actuators, or mechanical mechanism. In some embodiments, the front mower 406 is removeably coupled to a pivot mechanism 450 that is used to pivot the front mower about pivot point 448. In some embodiments, the pivot mechanism 450 is removeably coupled to the front hitch 416. In other embodiments, the pivot mechanism 450 is fixedly coupled to the front mower 406. In yet other embodiments, the pivot mechanism 450 is fixedly coupled to the front hitch 416. In other embodiments, the pivot mechanism 450 is coupled (removeably or fixedly) to vehicle 10, such as to a frame of vehicle 10. The pivot mechanism 450 is described in greater detail in FIG. 5.

The steering sensor 460 may be positioned on the vehicle 10 to measure the steering angle of the vehicle 10. In some embodiments, the steering sensor 460 is coupled to the steerable tractive elements 440 and configured to directly measure the angle of the tractive elements 440 in relation to a neutral (i.e., forward-facing) position. In other embodiments, the steering sensor 460 measures the steering angle of the tractive element 440 indirectly. For example, the steering sensor may be a global positioning system ("GPS") sensor and may use positioning data to determine what the steering angle of the vehicle 10 is based on the current travel trajectory of the vehicle 10. In other embodiments, the steering sensor measures the steering angle of the tractive elements 440 based on a position of a steering wheel or other steering input device of vehicle 10. In other embodiments, the steering sensor 460 is a camera that captures optical/image data and an image processor determines a steering angle from image data of the tractive elements.

The steering sensor 460 may be electrical or mechanical. In some embodiments, the steering sensor 460 is mechanical and the sensor is physically coupled to the pivot mechanism 450 so that the pivot mechanism 450 and the tractive elements rotate at the same rate. In other embodiments, the steering sensor 460 transmits an electrical signal to a controller (e.g., 702 of FIG. 7). Controller 702 may then determine various steering parameters from the electrical signal (e.g., turning radius, steering angle, speed of travel, magnitude of the turn, etc.).

In some embodiments, the steering sensor 460 transmits the electrical signal to the controller 702 by an international organization for standardization bus ("ISOBUS") system or a universal control module (UCM). In other embodiments, the steering sensor 460 transmits the electrical signal to the controller 702 by wireless means (e.g., through the use of various wireless communication protocols, including, but not limited to, Wi-Fi, cellular, Bluetooth, etc.).

Figure 5:
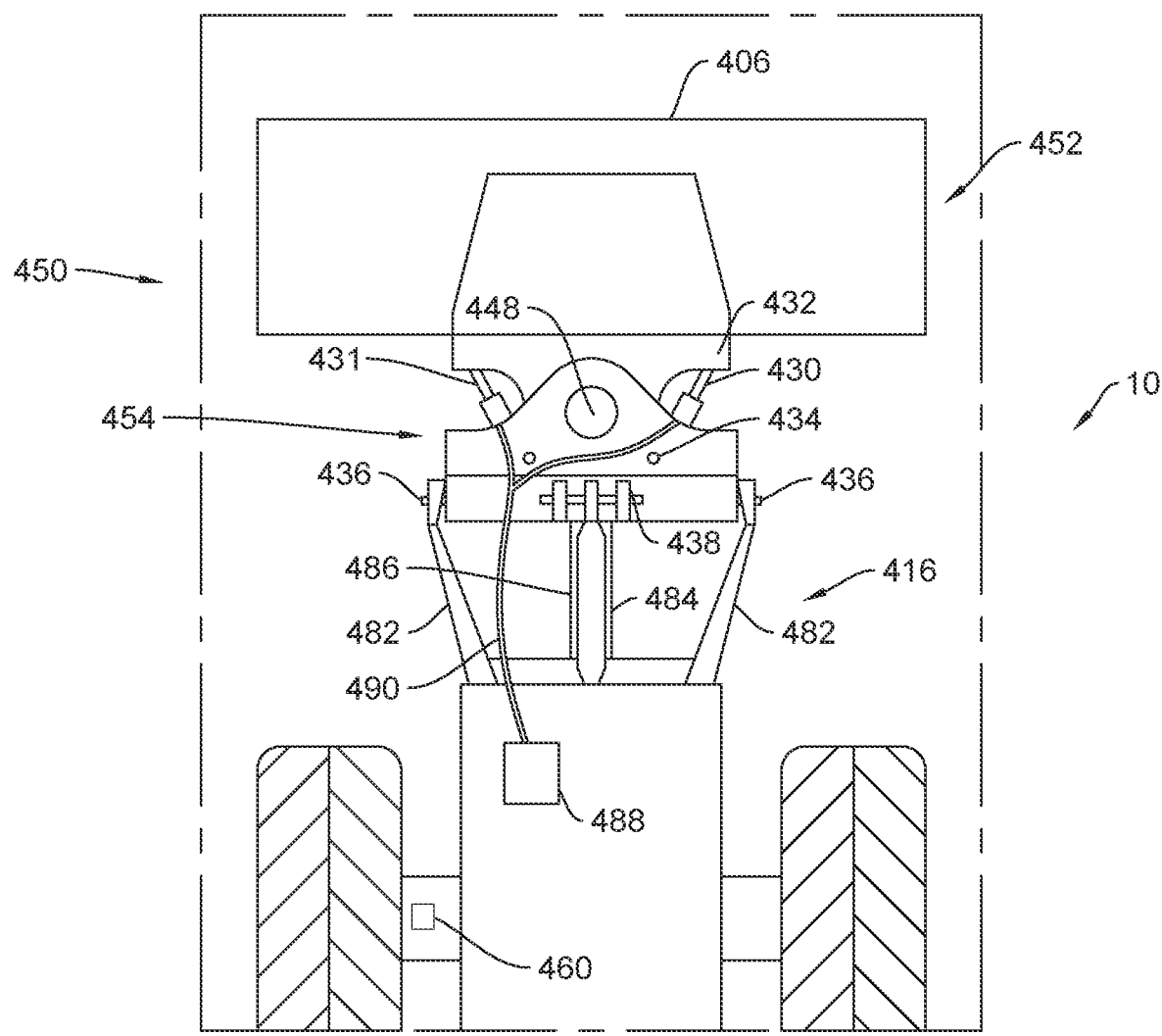
FIG. 5 is a top view of a pivot mechanism of the vehicle of FIG. 1, according to an exemplary embodiment.

Turning now to FIG. 5, a top view of the pivot mechanism 450 of vehicle 10 is shown. In some embodiments, the pivot mechanism 450 is fixedly coupled to the front mower 406.

The pivot mechanism 450 may include at least one actuating member 430, a pivot point 448, an upper mounting region 438, one or more lower mounting regions 436, a stationary portion 454, and a pivoting portion 452. Actuating member 430 may be any linear actuator. For example, actuating member 430 may be a screw jack, a ball screw, a lead screw a hydraulic actuator, a pneumatic actuator, a piezoelectric actuator, a linear motor, or a solenoid.

Screw jacks, ball screws, and lead screws are mechanical devices that use a screw to convert rotational motion (often generated by an electric motor) into linear motion. Hydraulic actuators use a hydraulic pressure to actuate a cylinder and piston in a linear motion. Pneumatic actuators use compressed air to convert rotational motion of a motor into pressure which may be transferred into linear motion. Piezoelectric actuators use a piezoelectric material to convert electrical energy into mechanical energy in a linear motion. Linear motors use a magnetic field to convert electrical energy into linear. Solenoids, use a coil of wire to generate a magnetic field, which is used to convert electrical energy into linear motion.

In an exemplary embodiment, the pivot mechanism 450 utilizes a hydraulic system to actuate the actuating member 430. Hydraulic systems are used to transmit power and energy through the use of a pressurized fluid, typically a liquid such as oil or water. The basic components of a hydraulic system include a reservoir, pump, valves, actuators, and hydraulic fluid. The hydraulic fluid is stored in the reservoir and is pumped through a series of valves and pipes using a pump. As the fluid is forced through the system, it generates pressure, which is used to power various hydraulic actuators, such as pistons housed in a cylinder.

The hydraulic fluid is typically incompressible, which means that it cannot be compressed or reduced in volume. This property is what allows hydraulic systems to generate large amounts of force with relatively small pumps and actuators. When the hydraulic fluid is forced into a cylinder or other actuator, it pushes against a piston or plunger, which generates force and movement.

The valves in a hydraulic system are used to control the flow of the hydraulic fluid and to direct it to the appropriate actuators. There are several types of valves used in hydraulic systems, including check valves, directional control valves, and pressure control valves.

Check valves are used to ensure that the hydraulic fluid flows in the correct direction, while directional control valves are used to control the direction of flow. Pressure control valves are used to maintain a constant pressure in the hydraulic system and to prevent damage to the system or components.

In an exemplary embodiment, vehicle 10 has a hydraulic system 488 that is in hydraulic communication with actuating member 430 and a second actuating member 431 through hydraulic line 490.

The actuating member 430 is used to actuate the pivot mechanism 450. According to an exemplary embodiment, the actuating member is a hydraulic piston and cylinder mechanism. A first end of the actuating member 430 is pivotably coupled to mounting point 432 of the pivoting portion 452. A second end of the actuating member 430 is pivotably coupled to mounting point 434 of the stationary portion 454. The stationary portion 454 is pivotably coupled to the pivoting portion 452 at pivot point 448. Pivot point 448 may include a cylindrical pin that allows the pivoting portion 452 to pivot about the pivot point 448 in relation to the stationary portion 454. The pivoting portion 452 is actuated by the actuating member 430. In embodiments in which the actuating member is a hydraulic piston and cylinder, the actuating member 430 extends as hydraulic pressure is applied to the actuating member. This causes mounting point 432 to extend farther away from mounting point 434. As this extension occurs, the pivoting portion 452 of the pivot mechanism 450 pivots counterclockwise about the pivot point 448, when viewing the pivot mechanism top-down. In some embodiments, the pivot mechanism 450 includes the second actuating member 431 acting opposite the actuating member 430 to pivot the pivoting portion 452. For example, as actuating member 430 extends, the second actuating member 431 retracts.

The pivot mechanism 450 removeably couples to at least one lower link 482 of the front hitch 416 at the lower mounting regions 436 and the top link 484 of the front hitch 416 at the upper mounting region 438. In some embodiments, two lower links 482 are removeably coupled to the pivot mechanism 450 of the front mower 406. In some embodiments, hitch pins and lynch pins are used to removeably couple the mounting regions 436, 438 to the top and lower links 482, 484. However, in other embodiments, the mounting regions 436, 438 to the top and lower links 482, 484 may be removeably coupled in other manners such as tongue-and-groove connections, a locking pin, etc.

In some embodiments, the hydraulic line 490 is coupled to the front mower 406 to actuate certain functions of the front mower 406. For example, hydraulic system 488 of the vehicle 10 may be used to lift the front mower 406. In other embodiments, the hydraulic system 488 may be used to lift the front hitch 416. In other embodiments, the hydraulic system 488 may be used to rotate the disc blades of the front mower 406.

Figure 6:
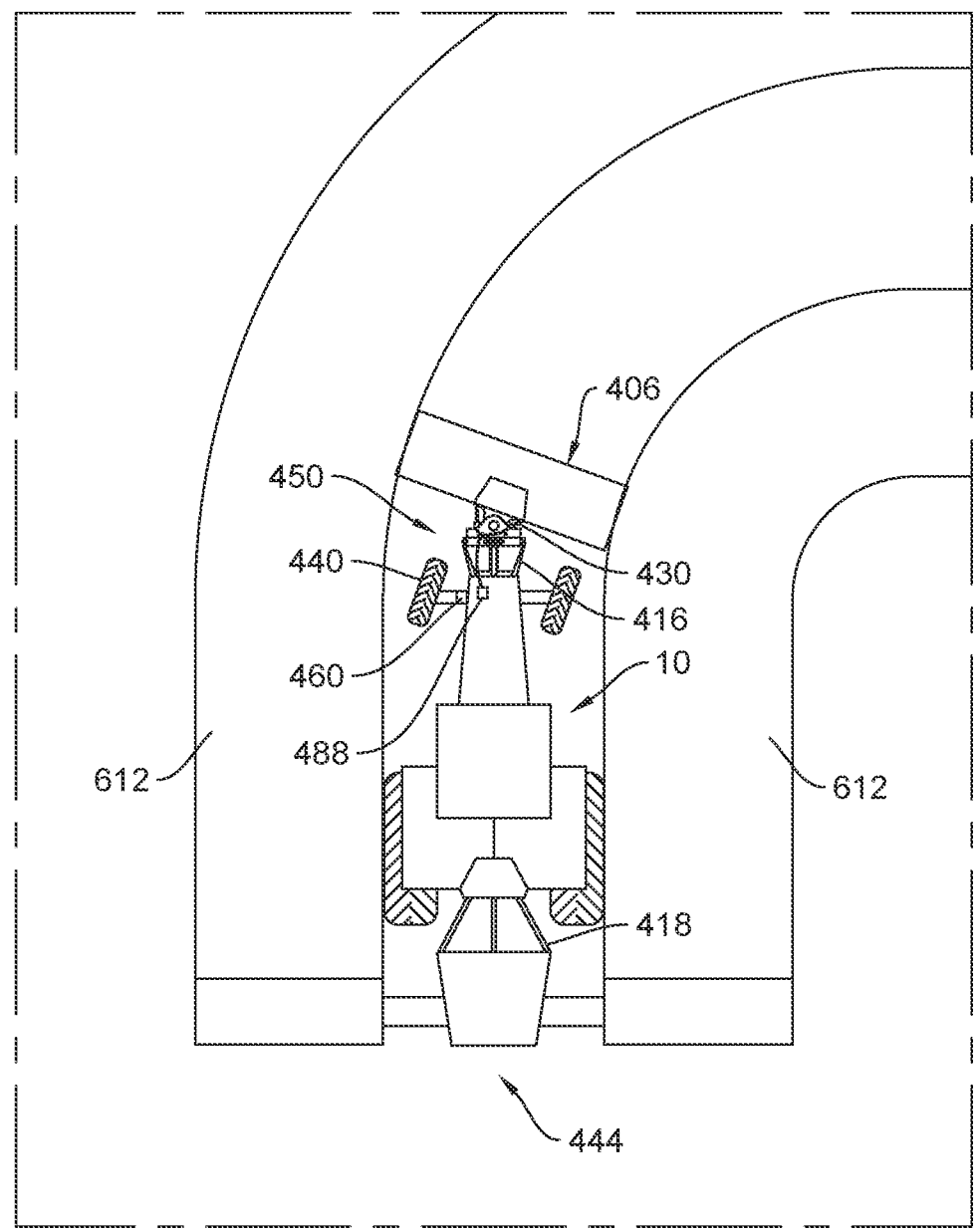
FIG. 6 is a top view of the vehicle of FIG. 1 in a turning event, according to an exemplary embodiment.

Turning now to FIG. 6, a top view of vehicle 10 in a right-hand turning event with the pivot mechanism 450 pivoted clockwise from the neutral position of FIG. 5 (from a top-down view). When in a turning event, the steering sensor 460 transmits an electrical signal to the controller 702 of FIG. 7. This electrical signal is interpreted and a steering angle is determined. The controller 702 then sends a control signal to actuate the pivot mechanism through the use of at least actuating member 430. This control signal may be sent through/by a universal control module ("UCM"). By pivoting the front mower 406 during a turning event, the front mower 406 may engage with the crop to be mowed perpendicular to the cutting mechanism, thus engaging with the crop at the optimal angle. In addition, by pivoting the front mower 406, an optimal overlap between the front mower 406 and the rear-mounted mowers 444 is maintained and no crop is missed being mowed during the turning event.

In some embodiments, the rear-mounted mowers 444 may be laterally adjusted by the rear hitch 418 to further increase overlap of the front-mounted mower 406 and the rear-mounted mowers 444.

The rear-mounted mowers 444 may be laterally adjusted by any number of ways suitable in the art. In one embodiment, a three-point hitch to which the rear-mounted mowers 444 are coupled is adjusted by the hydraulic system 488 to shift the rear-mounted mowers 444 laterally to compensate during a turn.

A three-point hitch may be an electrical or hydraulic system used on vehicle 10 to attach and control agricultural implements, such as the front- and rear-mounted mowers 406, 444. It is a mechanism that allows implements to be raised and lowered and adjusted side-to-side. Lateral adjustment of the implement attached to a three-point hitch is typically achieved by extending and retracting the links of the three-point hitch, using a draw bar, or other actuators to adjust the hitch to the side.

The top link is a shorter arm that connects the vehicle 10 to the implement and may be used for side-to-side adjustment. To adjust the implement laterally, the operator can use the vehicle's hydraulic system 488 to raise or lower one side of the implement, and then adjust the length of the top link to tilt the implement to the desired angle. This allows the implement to follow the contour of the ground and/or to compensate for uneven terrain or turning events of vehicle 10.

The hydraulic system 488 may be used for automatic lateral adjustment of implements (e.g., front- and rear-mounted mowers 406, 444). A processor of Vehicle 10 may use sensors (e.g., steering sensor 460) or GPS technology to detect changes in the terrain or turning events and adjust the position of the implement accordingly.

In addition to lateral adjustment, a three-point hitch can also be used to adjust the implement's height and depth. Height adjustment is typically achieved using the hydraulic system 488 to raise or lower the implement, while depth adjustment is achieved by adjusting the position of the lower hitch points.

Figure 7:
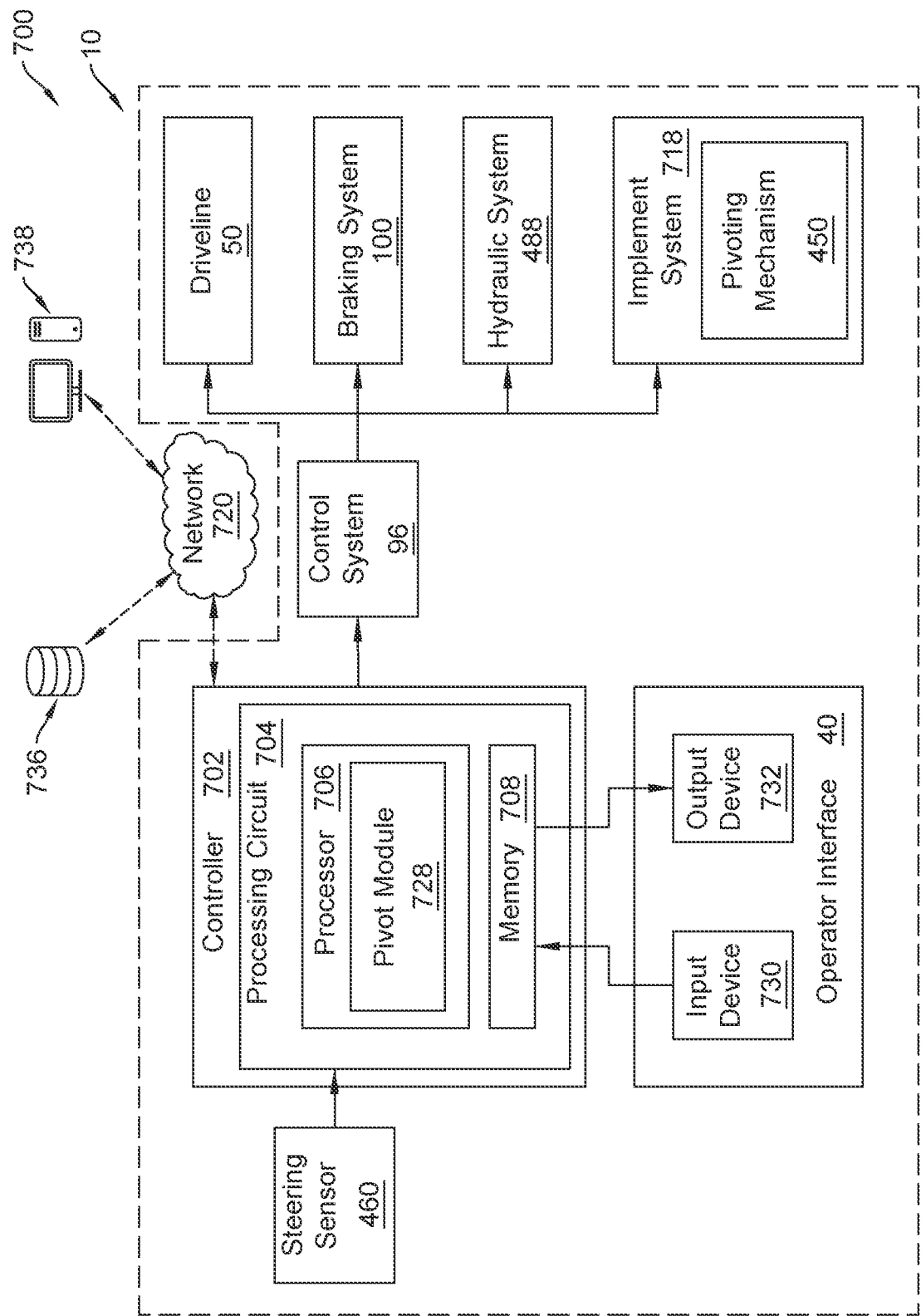
FIG. 7 is a schematic diagram of a mower pivot system of the vehicle of FIG. 1, according to an exemplary embodiment.

Turning now to FIG. 7, a schematic diagram of a pivot adjustment system 700 of vehicle 10 is shown.

Pivot adjustment system 700 includes a controller 702, a steering sensor 460, the operator interface 40, the control system 97, the driveline 50, the braking system 100, the hydraulic system 488, an implement system 718, a network 720, a database 736, and a remote user device 738. In some embodiments, the controller 702 is included in the control system 96.

The controller 702 comprises, in some embodiments, processing circuitry 704, a processor 706, and memory 708. In some embodiments, the controller 702 is configured to control the operation of the vehicle 10 and any implements (e.g., mowers) attached thereto and part of the implement system 718. The memory 708 may contain one or more instructions that, when executed by the processor 706, cause the processor 706 to perform one or more of the actions described herein. For example, memory 708 may include a pivot module 728. In some embodiments the memory 708 is in communication with the processor 706. Processor 706 may include one or more modules, that when executed, may perform one or more of the actions described herein.

The pivot module 728 may receive data and/or signals from the steering sensor 460. The pivot module 728 may further use the received data and/or signals from steering sensor 460 to determine various characteristics and attributes of a turning event of vehicle 10. For example, a turning event may be an event in which the operator (whether human or software, and whether local or remote) transmits an instruction to adjust the steering angle of vehicle 10 which causes the vehicle 10 to operate in a turning manner. In other embodiments, the operator may selectively apply a brake to one or more of the tractive elements 440 to cause a turning event. A turning event may occur at any speed or any turning magnitude.

Controller 702 is configured to control the operation of various components of the vehicle 10. The controller 702 may receive information (e.g., sensor data, user inputs, etc.) or provide information (e.g., commands, etc.) to a variety of components to facilitate operation of the vehicle 10. According to the exemplary embodiment of FIG. 7, the controller 702 is operatively coupled to the prime mover 52, the energy storage 54, the transmission 56, the transfer case 58, the braking system 100, the implement system 718, the hydraulic system 488, and the operator interface 40. In other embodiments, the controller 702 is operatively coupled to different components.

In some embodiments, the controller 702 is configured to provide information (e.g., commands) to control the prime mover 52 (e.g., activating or deactivating the prime mover 52, controlling the output power, etc.), the energy storage 54 (e.g., controlling the rate of discharge, etc.), the transmission 56 (e.g., controlling shifting, etc.), the transfer case 58 (e.g., controlling engagement of the front output and the rear output, etc.), the braking system 100 (e.g., to provide a braking force, etc.), the implement system 718 (e.g., to actuate the lateral adjuster 734 to laterally adjust the implement during a turn event or inclination event), and the operator interface 40 (e.g., to provide specific information to the operator, etc.). The controller 702 may provide electrical signals, pneumatic signals (e.g., by controlling a valve or compressor), hydraulic signals (e.g., by controlling a valve or pump), or mechanical signals (e.g., by applying a force to a linkage or cable, etc.) to facilitate control of the vehicle 10. By way of example, the controller 702 may control the lateral adjustment movements of implement system 718. In some embodiments, the controller 702 may control the pivot mechanism 450 and the corresponding actuating members 430. In some embodiments, the implement system 718 is a triple mower configuration coupled to the vehicle 10 with the front-mounted mower 406 and the rear-mounted mowers 444, as shown in FIG. 4.

In some embodiments, the controller 702 is configured to receive information from the prime mover 52 (e.g., engine speeds, engine temperatures, etc.), the energy storage 54 (e.g., a charge level of a battery, a fill level of a fuel tank, etc.), the transmission 56 (e.g., the current gear, etc.), the transfer case 58 (e.g., which of the front output 70 and the rear output 72 are engaged, etc.), the braking system 100 (e.g., the current engaged/disengaged state, etc.), the implement system 718 (e.g., the current lateral/vertical position and speed), the steering sensor 460 (e.g., a steering angle), and the operator interface 40 (e.g., commands provided by an operator, etc.). Each of these components may include sensors to facilitate transferring information to the controller 702. In some embodiments, the processor 706 executes the operations of the controller 702 as described above.

The operator interface 40 comprises, in some embodiments, an input device 730 and an output device 732. In some embodiments, the input device 730 and output device 732 are communicably coupled. The input device 730 is also communicably coupled to the controller 702. The output device 732 is also communicatively coupled to the controller 702. The input device 730 is configured to receive input from a user operating vehicle 10. The operator interface 40 may include one or more input devices 730 configured to receive an input from the user. By way of example the operator interface 40 may include one or more switches, knobs, dials, styluses, touch screens, microphones, or other input devices. The output device 732 may include one or more output devices configured to provide information to the user. By way of example, the output device 732 may include one or more screens, lights, speakers, haptic feedback devices, or other output devices. In some embodiments the operator interface 40 is positioned within the cab 30, such that the operator can interact with the operator interface 40 to control the vehicle 10 while positioned within the cab 30.

The control system 96 comprises, in some embodiments, processing circuitry to receive signal outputs from controller 702 (e.g., outputted signals from the processor 706 when executing the pivot module 728) and transmit control signals to the driveline 50, the braking system 100, the hydraulic system 488, and the implement system 718. In some embodiments, the controller 702 transmits control signals directly to the driveline 50, the braking system 100, the hydraulic system 488, and the implement system 718. In other embodiments, the control system 96 transmits the control signals to the driveline 50, the braking system 106, and the implement system 718. The driveline 50 may include various components as further described in FIGS. 1-3. the braking system 100 may include various components as further described in FIGS. 1-3. The hydraulic system 488 may include various components as further described in FIG. 5. The implement system 718 may include various components as further described in FIGS. 4-6.

The implement system 718 comprises, in some embodiments, the front hitch 416, the front PTO 486 (as shown in FIG. 5), the rear hitch 418, the rear PTO 489 (as shown in FIG. 4), the hydraulic system 488, the pivot mechanism 450, and at least one implement (e.g., front- and rear-mounted mowers 406, 444). The front hitch 416 may be any suitable hitching mechanism to couple a front implement to the front portion of the vehicle 10. For example, the front hitch 416 may be a front loader arm, a three-point hitch, a ball hitch, etc. The front PTO may be configured to operatively couple to the front implement to actuate the front implement (e.g., raise, lower, spin, and otherwise move). The front PTO 486 may be operatively coupled to the prime mover 52 and caused to operate through the movement of the prime mover 52. The rear PTO 489 may similarly be configured, but at the rear portion of the vehicle 10 and configured to operate and/or actuate a rear implement.

The hydraulic system 488 may be housed on the vehicle 10 or the front or rear implement. The hydraulic system 488 may be used to operate the at least one implement (e.g., actuate the mower blades). In other embodiments, the hydraulic system 488 may also adjust the front hitch 416 and the rear hitch 418 both laterally and vertically. The hydraulic system 488 comprises a hydraulic pump, a control valve, hydraulic cylinders, and hydraulic line 490 (as shown in FIG. 5). When the operator activates the hydraulic system 488, the pump generates pressure, which is used to operate the cylinders (e.g., actuating member 430) and move the implement or hitch components.

For example, to adjust the height of the front hitch 416 (and by extension, the implement), the operator activates the hydraulic system 488, which raises or lowers the hitch using the hydraulic cylinders. The operator can control the height of the implement using the input device 730, such as a control lever or other control mechanism in the vehicle's cab.

To adjust the lateral position of the front hitch 416, the operator adjusts the lengths of the links. This may be done by using a control lever of the input device 730 or other mechanism in the vehicle's cab to send control signals from the controller 702 to control system 96 to send a control signal to the hydraulic system 488 to lengthen or shorten the links. In other embodiments, the controller 702 automatically adjusts the position of the actuating member 430 by sending signals either directly to the hydraulic system or through the control system 96.

The hydraulic system 488 can also be used to operate other hydraulic functions on the vehicle 10 or implement system 718, such as powering a hydraulic motor or opening and closing valves. This allows for a wide range of flexibility and control over the operation of the vehicle and implement.

In some embodiments, the pivot adjustment system 700 includes a network 720 through which to communicate with various remote devices and servers communicably coupled to the network 720. According to an embodiment, the controller 702 is communicably coupled to the network 720, wherein a database 736 is also communicably coupled to network 720. The database 736 may be hosted by a remote server communicably coupled to the network 720. In some embodiments, the database 736 stores information, algorithms, or other software related to pivot adjustments, steering variables, turning/inclination events, maps, and calibrations between such. Such information may include calculations and formulas to determine optimal adjustments of the implement system based on received sensor data (e.g., from steering sensor 460). In some embodiments, the pivot module is hosted on the database 736 and/or a remote user device 738. In other embodiments the database 736 is stored locally in memory 708. The memory 708 may include instructions, that when executed by the processor 706, output a signal to adjust the implement system 718 (e.g., the rear-mounted mowers 444 or front-mounted mower 406).

In some embodiments, the vehicle 10 is remotely controlled by remote user device 738. In such embodiments, the controller 702 may receive, through the network 720, signals from remote user device 738 to control the driveline 50, braking system 100, hydraulic system 488, or implement system 718. In other embodiments, a user may adjust various operating parameters of the vehicle 10 through the use of remote user device 738. For example, the user may input a modification to an operating parameter of vehicle 10 at remote user device 738. The modification may be transmitted to the controller 702 by the network 720. The controller may then execute the modification by sending a control signal to the control system 96 or directly to the various components to be modified. The controller 702 may include a communication interface module to facilitate communication to and from the network 720.

Figure 8:
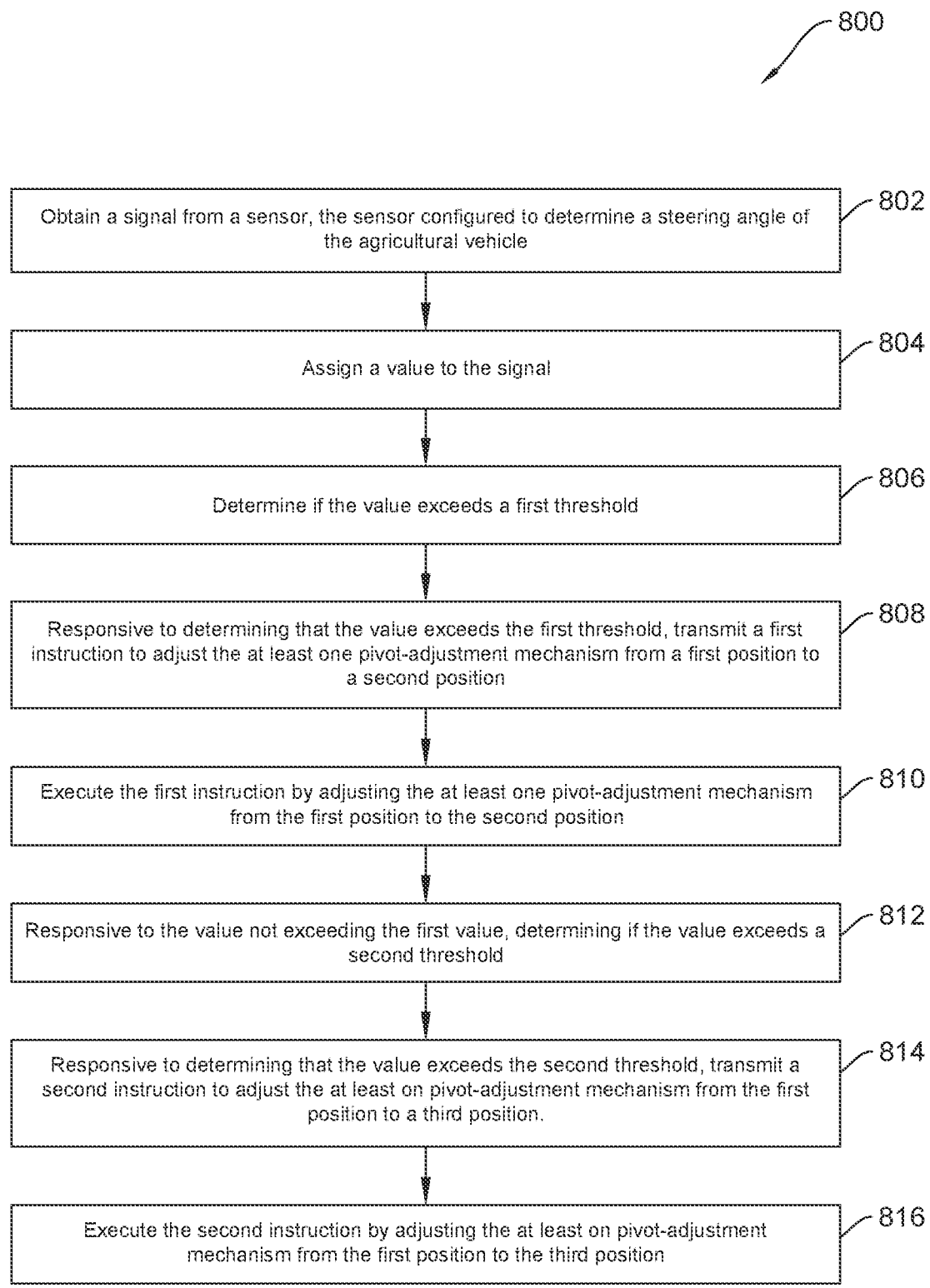
FIG. 8 is a flow diagram of a process to pivot a mower of the vehicle of FIG. 1, according to an exemplary embodiment.

Turning now to FIG. 8, a flow diagram of a pivot adjustment method 800 of the front-mounted mower 406 is shown. Pivot adjustment method 800 includes at least step 802, step 804, step 806, step 808, step 810, step 812, step 814, and step 816. The pivot adjustment method 800 is an exemplary embodiment of the present disclosure as executed by the pivot adjustment system 700 of FIG. 7.

Step 802 may include obtaining a signal from a sensor, the sensor configured to determine a steering angle of the agricultural vehicle. In some embodiments, the sensor of step 802 is the steering sensor 460 of FIG. 4. In some embodiments, the steering sensor 460 is configured to measure a steering angle of the vehicle 10. Various methods may be used to measure the steering angle of vehicle 10, including electrical, optical, and mechanical methods and mechanisms. For example, steering sensor 460 may be a steering angle sensor, a potentiometer, a magnetic sensor, an optical sensor, or a mechanical linkage.

The steering angle sensor measures the position of the steering wheel of vehicle 10 and the angle of the front wheels. This sensor is typically connected to the vehicle's electronic control unit (ECU). In some embodiments, it is coupled to the ISOBUS of UCM.

The potentiometer is an electrical device that measures the position of a rotating shaft. It can be used to measure the steering angle of a vehicle by attaching it to the steering column or rack-and-pinion assembly. As the steering wheel is turned, the potentiometer rotates and generates an electrical signal that is proportional to the steering angle.

Magnetic sensors can be used to measure the position of a rotating magnet attached to the steering column or rack-and-pinion assembly. The sensor generates an electrical signal that is proportional to the steering angle.

Optical sensors use a light source and a detector to measure the position of a rotating disc or strip attached to the steering column or rack-and-pinion assembly. As the disc or strip rotates, it interrupts the light beam, generating an electrical signal that can be used to calculate the steering angle.

The steering angle may be measured by mechanical linkages. The steering angle may be measured using a mechanical linkage that connects the steering column or rack-and-pinion assembly to a gauge or display. As the steering column rotates it actuates the mechanical linkage to display the steering angle. In some embodiments, the mechanical linkage is coupled to the pivot mechanism 450 and actuates the pivot mechanism 450 as the steering angle changes.

Step 804 may include assigning a value to the signal. Once the signal is obtained (e.g., by the controller 702) the controller 702 may assign the signal a value proportional to the steering angle. In some embodiments, the processor executes instructions of the pivot module 728 in memory 708 to receive the signal and assign the signal a value. The value may be a single value representative of a single turn characteristic (e.g., steering angle), or it may be a set of values representative of a set of turn characteristics (e.g., steering angle, ground speed, traction slip, etc.). In other embodiments, the value may be a unique value representative of several turn characteristics (e.g., a unique value that combines speed with steering angle). The assigned value may be stored locally in memory 708 or remotely on database 736.

Step 806 may include determining if the value exceeds a first threshold. The pivot module 728 may then use the assigned value to determine if it exceeds a first threshold. In some embodiments, the first threshold is predetermined by the operator of vehicle 10 and inputted to the pivot module 728 through the use of the operator interface 40. The first threshold can represent a steering angle that the measured steering angle must exceed before adjusting the pivot mechanism 450. For example, to avoid constant adjustment of the pivot mechanism 450, the operator may determine that the steering angle of vehicle 10 must exceed 5 degrees from a neutral position (i.e., traveling straight). This threshold of +/−5 degrees allows the operator to make small adjustments in steering without actuating the pivot mechanism 450.

In some embodiments, the threshold may be a range (e.g., +/−5 degrees).

Step 808 may include, responsive to determining that the value exceeds the first threshold, transmitting a first instruction to adjust the at least one pivot-adjustment mechanism from a first position to a second position. In executing pivot adjustment module 728, upon the processor 706 determining that the value (e.g., the steering angle) exceeds the threshold, the processor 706 may transmit an instruction to the control system 96 to adjust the pivot-adjustment mechanism (e.g., the pivot mechanism 450 or the actuating member 430). This instruction may be sent to the control system 96 for control system 96 to then transmit the necessary control signals to the hydraulic system 488 to adjust the actuating member 430. In some embodiments, the processor 706 is part of the control system 96, and in such embodiments sends the control signal to the hydraulic system 488 (or other actuating system) to adjust the actuating member 430 from a first position (e.g., a neutral position) to a second position (e.g., an extended position). In some embodiments, the pivot mechanism 450 is actuated so that the front-mounted mower 406 is angled at the same angle as the determined steering angle.

Step 810 may include executing the first instruction by adjusting the at least one pivot-adjustment mechanism from the first position to the second position. After receiving the control signal to adjust the pivot mechanism 450, the actuating system (e.g., the hydraulic system 488) executes the instruction by actuating. In some embodiments, this includes extending/retracting a hydraulic cylinder. In other embodiments, a ball screw is actuated to extend/retract the corresponding nut. In other embodiments, a solenoid is extended/retracted.

Step 812 may include, responsive to the value not exceeding the first value, determining if the value exceeds a second threshold. In some embodiments, the second threshold may be the second threshold for a range. For example, the first threshold may be +5 degrees and the second threshold may be −5 degrees. In this example, the system will not adjust the pivot mechanism 450 unless the steering angle is outside of the range of +/−5 degrees. If the steering angle is not outside (i.e., exceeding) the first threshold of +5 degrees (as determined in step 806) the system may determine if the steering angle is outside (i.e., exceeding) the second threshold of −5 degrees (as determined in 812). This comparison may be accomplished by the processor 706 when executing the pivot module 728. It should be understood that the values provided in the examples above (e.g., +/−5 degrees) are for exemplary purposes only and should not be construed as limiting in any way.

Step 814 may include, responsive to determining that the value exceeds the second threshold, transmit a second instruction to adjust the at least one pivot-adjustment mechanism from the first position to a third position. While different in scope, step 814 may be executed in substantially the same way as step 808, but by transmitting an instruction to adjust the pivot mechanism 450 in a direction opposite step 808 (e.g., retracting the actuating member 430 instead of extending the actuating member).

Step 816 may include executing the second instruction by adjusting the at least one pivot-adjustment mechanism from the first position to the third position. While different in scope, step 816 may be executed in substantially the same way as step 809, but by adjusting the pivoting mechanism in a direction opposite as step 809 (e.g., retracting the actuating member 430 instead of extending the actuating member).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

The invention claimed is:

1. A system comprising:
an agricultural vehicle;
a rear-mounted mower coupled to the agricultural vehicle by a rear hitch;
a front-mounted mower pivotably coupled to a front hitch by a pivot member and at least one pivot-adjustment mechanism, the front hitch removeably coupled to the agricultural vehicle; and
a control system configured to control the front-mounted mower, the control system comprising processing circuitry configured to:
obtain a signal from a sensor, the sensor configured to determine a steering angle of the agricultural vehicle;
assign a value to the signal;
determine if the value exceeds a first threshold;
responsive to determining that the value exceeds the first threshold, transmit a first instruction to adjust the at least one pivot-adjustment mechanism from a first position to a second position;
execute the first instruction by adjusting the at least one pivot-adjustment mechanism from the first position to the second position;
responsive to the value not exceeding the first threshold, determine if the value exceeds a second threshold;
responsive to determining that the value exceeds the second threshold, transmit a second instruction to adjust the at least one pivot-adjustment mechanism from the first position to a third position; and
execute the second instruction by adjusting the at least one pivot-adjustment mechanism from the first position to the third position.

2. The system of claim 1, wherein the at least one pivot-adjustment mechanism is a hydraulic piston and cylinder mechanism.

3. The system of claim 1, wherein the sensor is communicably coupled to a steering mechanism of the agricultural vehicle to measure the steering angle of the agricultural vehicle.

4. The system of claim 1, wherein the sensor is communicably coupled to the processing circuitry by a universal control module (UCM) of the agricultural vehicle.

5. The system of claim 1, wherein the processing circuitry is communicably coupled to the at least one pivot-adjustment mechanism by an international organization for standardization bus (ISOBUS).

6. The system of claim 1, wherein the first position is a neutral position, the second position is an extended position, and the third position is a retracted position.

7. The system of claim 1, wherein the second position adjusts the front-mounted mower to a position perpendicular to a direction of travel of the agricultural vehicle.

8. A control system comprising processing circuitry configured to:
obtain a signal from a sensor, the sensor configured to determine a steering angle of an agricultural vehicle;
assign a value to the signal;
determine if the value exceeds a first threshold;
responsive to determining that the value exceeds the first threshold, transmit a first instruction to adjust at least one pivot-adjustment mechanism pivotably coupled to a front-mounted mower from a first position to a second position;
execute the first instruction by adjusting the at least one pivot-adjustment mechanism from the first position to the second position;
responsive to the value not exceeding the first threshold, determine if the value exceeds a second threshold;
responsive to determining that the value exceeds the second threshold, transmit a second instruction to adjust the at least one pivot-adjustment mechanism from the first position to a third position; and
execute the second instruction by adjusting the at least one pivot-adjustment mechanism from the first position to the third position.

9. The control system of claim 8, wherein the at least one pivot-adjustment mechanism is a hydraulic piston and cylinder mechanism.

10. The control system of claim 8, wherein the sensor is communicably coupled to a steering mechanism of the agricultural vehicle to measure the steering angle of the agricultural vehicle.

11. The control system of claim 8, wherein the sensor is communicably coupled to the processing circuitry by a universal control module (UCM) of the agricultural vehicle.

12. The control system of claim 8, wherein the processing circuitry is communicably coupled to the at least one pivot-adjustment mechanism by an international organization for standardization bus (ISOBUS).

13. The control system of claim 8, wherein the first position is a neutral position, the second position is an extended position, and the third position is a retracted position.

14. The control system of claim 8, wherein the second position adjusts the front-mounted mower to a position perpendicular to a direction of travel of the agricultural vehicle.

15. A method comprising:
obtaining, by a processor, a signal from a sensor, the sensor configured to determine a steering angle of an agricultural vehicle;
assigning, by the processor, a value to the signal;
determining, by the processor, if the value exceeds a first threshold;
responsive to determining that the value exceeds the first threshold, transmitting, by the processor, a first instruction to adjust at least one pivot-adjustment mechanism pivotably coupled to a front-mounted mower from a first position to a second position;
executing, by the at least one pivot-adjustment mechanism, the first instruction by adjusting the at least one pivot-adjustment mechanism from the first position to the second position;
responsive to the value not exceeding the first threshold, determining, by the processor, if the value exceeds a second threshold;
responsive to determining that the value exceeds the second threshold, transmitting, by the processor, a second instruction to adjust the at least one pivot-adjustment mechanism from the first position to a third position; and
executing, by the at least one pivot-adjustment mechanism, the second instruction by adjusting the at least one pivot-adjustment mechanism from the first position to the third position.

16. The method of claim 15, wherein the at least one pivot-adjustment mechanism is a hydraulic piston and cylinder mechanism.

17. The method of claim 15, wherein the sensor is communicably coupled to a steering mechanism of the agricultural vehicle to measure the steering angle of the agricultural vehicle.

18. The method of claim 15, wherein the sensor is communicably coupled to a processing circuitry by a universal control module (UCM) of the agricultural vehicle.

19. The method of claim 15, wherein the first position is a neutral position, the second position is an extended position, and the third position is a retracted position.

20. The method of claim 15, wherein the second position adjusts the front-mounted mower to a position perpendicular to a direction of travel of the agricultural vehicle.

* * * * *